(12) United States Patent
Christensen et al.

(10) Patent No.: US 7,288,147 B2
(45) Date of Patent: Oct. 30, 2007

(54) PROVIDING FREEZING AND THAWING RESISTANCE TO CEMENTITIOUS COMPOSITIONS

(75) Inventors: Bruce J. Christensen, Shanghai (CN); Thomas M. Vickers, Jr., Concord Township, OH (US)

(73) Assignee: Construction Research&Technology GmbH, Trostberg (DE)

( * ) Notice: Subject to any disclaimer, the term of this patent is extended or adjusted under 35 U.S.C. 154(b) by 0 days.

(21) Appl. No.: 11/152,005

(22) Filed: Jun. 14, 2005

(65) Prior Publication Data

US 2005/0274285 A1    Dec. 15, 2005

Related U.S. Application Data

(60) Provisional application No. 60/579,975, filed on Jun. 15, 2004, provisional application No. 60/579,691, filed on Jun. 15, 2004.

(51) Int. Cl.
| | |
|---|---|
| C04B 38/02 | (2006.01) |
| C04B 38/10 | (2006.01) |
| C04B 103/42 | (2006.01) |
| C04B 111/40 | (2006.01) |
| C04B 111/76 | (2006.01) |

(52) U.S. Cl. .................. 106/677; 106/672; 106/673; 106/674; 106/678

(58) Field of Classification Search ............... 106/672, 106/673, 677, 674, 678
See application file for complete search history.

(56) References Cited

U.S. PATENT DOCUMENTS

| | | | |
|---|---|---|---|
| 2,797,201 A | | 6/1957 | Veatch et al. |
| 3,272,765 A | | 9/1966 | Sefton |
| 3,361,688 A | | 1/1968 | Bonitz et al. |
| 3,591,394 A | | 7/1971 | Diggelmann et al. |
| 3,804,058 A | | 4/1974 | Messenger |
| 3,902,911 A | | 9/1975 | Messenger |
| 4,057,526 A | | 11/1977 | de Rook |
| 4,142,909 A | | 3/1979 | Gaines |
| 4,234,344 A | | 11/1980 | Tinsley et al. |
| 4,252,193 A | | 2/1981 | Powers et al. |
| 4,303,736 A | * | 12/1981 | Torobin ............ 428/403 |
| 4,340,510 A | | 7/1982 | Howanietz et al. |
| 4,367,093 A | | 1/1983 | Burkhalter et al. |
| 4,427,836 A | | 1/1984 | Kowalski et al. |
| 4,450,010 A | | 5/1984 | Burkhalter et al. |
| 4,468,498 A | | 8/1984 | Kowalski et al. |
| 4,594,363 A | | 6/1986 | Blankenship et al. |
| 4,654,084 A | * | 3/1987 | Heinen ............ 106/808 |
| 5,188,889 A | | 2/1993 | Nagatomi et al. |
| 5,508,313 A | | 4/1996 | Delgado et al. |
| 5,571,318 A | | 11/1996 | Griffith et al. |
| 5,728,209 A | | 3/1998 | Bury et al. |
| 6,060,535 A | | 5/2000 | Villar et al. |
| 6,485,560 B1 | | 11/2002 | Scherer et al. |
| 6,508,305 B1 | * | 1/2003 | Brannon et al. ............ 166/293 |
| 6,572,697 B2 | | 6/2003 | Gleeson et al. |
| 6,617,364 B2 | * | 9/2003 | Soane et al. ................. 521/56 |
| 6,626,991 B1 | | 9/2003 | Drochon et al. |
| 6,722,434 B2 | | 4/2004 | Reddy et al. |
| 2002/0117086 A1 | | 8/2002 | Shi et al. |
| 2003/0110985 A1 | | 6/2003 | Scherer et al. |
| 2003/0116064 A1 | | 6/2003 | Danican et al. |
| 2003/0205172 A1 | | 11/2003 | Gleeson et al. |
| 2003/0221831 A1 | | 12/2003 | Reddy et al. |
| 2004/0147406 A1 | | 7/2004 | Boncan |
| 2004/0168801 A1 | | 9/2004 | Reddy et al. |
| 2004/0221990 A1 | * | 11/2004 | Heathman et al. .......... 166/292 |
| 2005/0098317 A1 | | 5/2005 | Reddy et al. |
| 2005/0274294 A1 | * | 12/2005 | Brower et al. ............... 106/802 |
| 2005/0284340 A1 | | 12/2005 | Vickers et al. |
| 2006/0281835 A1 | | 12/2006 | Ong |
| 2006/0281836 A1 | | 12/2006 | Kerns et al. |

FOREIGN PATENT DOCUMENTS

| | | |
|---|---|---|
| AU | 404612 | 5/1967 |
| DE | 19 61 390 A1 | 6/1971 |
| DE | 2 229 094 | 1/1973 |
| DE | 30 26 719 A1 | 5/1981 |
| EP | 0 022 633 B1 | 1/1981 |
| EP | 0 073 529 B1 | 3/1981 |
| EP | 0 118 325 B1 | 7/1986 |
| JP | 07-206505 A | 8/1995 |

OTHER PUBLICATIONS

Patent Abstracts of Japan, vol. 1996, No. 02, Feb. 29, 1996 & JP 07 277794 A (Kanegafuchi Chem Inc. Co. Ltd. Oct. 24, 1995.

Patent Abstracts of Japan, vol. 1999, No. 11, Sep. 30, 1999 & JP 11 147777 A (Kanegafuchi Chem Ind Do. Ltd., Jun. 2, 1999.

Patent Abstracts of Japan, vol. 1999, No. 14, Dec. 22, 1999 & JP 11 246253 A (Taisei Corp) Sep. 14, 1999.

Patent Abstracts of Japan, vol. 1996, No. 07, Jul. 31, 1996 & JP 08 059327 A (Hokkaido Kaihatsukyoku Doboku Kenkyusho Shin Etsu Chem Co. Ltd. Mar. 5, 1996.

(Continued)

*Primary Examiner*—Anthony J. Green
(74) *Attorney, Agent, or Firm*—Curatolo Sidoti Co. LPA; Joseph G. Curatolo; Salvatore A. Sidoti

(57) ABSTRACT

An improved freeze-thaw durability wet cast cementitious composition is provided that uses in-situ production of gas by gas generating additives and optionally polymeric microspheres that are blended directly into the mixture. The gas generating additives and the polymeric microspheres provide void spaces in the material matrix, and such void spaces act to increase freeze-thaw durability of the material.

21 Claims, No Drawings

OTHER PUBLICATIONS

Internet Article, "PM 6550 Hollow Spheres" (www.sphereone.net/extendospheres/PM%206550%20PDS.pdf) (no date).

Internet Brochure, Apr. 25, 2005, "EXPANCEL microspheres expand—and so does your profitability" (www.expancel.com/All_languages/about/files/EXPGEN002EN_Expancel%C2%AEMagic.pdf) (no date).

Betonwerk+Fertigteil-Technik—"A New Method of Making Concrete Resistant to Frost and De-icing Salts" by Dr. Sommer; Sep. 1978.

Patent Abstracts of Japan, vol. 2003, No. 02, Feb. 5, 2003 & JP 2002 294656 A (Life Stage Kigyo Kumiai, Oct. 9, 2002).

Patent Abstracts of Japan, vol. 1996, No. 09, Sep. 30, 1996 & JP 08 133799 A (Asahi Chem Ind Co Ltd; Toyo Sogo Kenkyusho:KK, May 28, 1996).

* cited by examiner

PROVIDING FREEZING AND THAWING RESISTANCE TO CEMENTITIOUS COMPOSITIONS

CROSS REFERENCE TO RELATED APPLICATIONS

This application claims the benefit of the filing date of U.S. Provisional Application Patent Ser. No. 60/579,975 filed Jun. 15, 2004 and U.S. Provisional Application Patent Ser. No. 60/579,691 filed Jun. 15, 2004.

BACKGROUND

It is well known that freezing and thawing cycles can be extremely damaging to water-saturated hardened cement compositions such as concrete. The best known technique to prevent or reduce the damage done is the incorporation in the composition of microscopically fine pores or voids. The pores or voids function as internal expansion chambers and can therefore protect the concrete from frost damage by relieving the hydraulic pressure caused by an advancing freezing front in the concrete. The method used in the prior art for artificially producing such voids in concrete has been by means of air-entraining agents, which stabilize tiny bubbles of air that are entrapped in the concrete during mixing.

These air voids are typically stabilized by use of surfactants during the mixing process of wet cast concrete. Unfortunately, this approach of entraining air voids in concrete is plagued by a number of production and placement issues, some of which are the following:

Air Content—Changes in air content of the cementitious mixture can result in concrete with poor resistance to freezing and thawing distress if the air content drops with time or reduce the compressive strength of concrete if the air content increases with time. Examples are pumping concrete (decrease air content by compression), job-site addition of a superplasticizer (often elevates air content or destabilizes the air void system), interaction of specific admixtures with the air-entraining surfactant (could increase or decrease air content).

Air Void Stabilization—The inability to stabilize air bubbles can be due to the presence of materials that adsorb the stabilizing surfactant, i.e., fly ash with high surface area carbon or insufficient water for the surfactant to work properly, i.e, low slump concrete.

Air Void Characteristics—Formation of bubbles that are too large to provide resistance to freezing and thawing, can be the result of poor quality or poorly graded aggregates, use of other admixtures that destabilize the bubbles, etc. Such voids are often unstable and tend to float to the surface of the fresh concrete.

Overfinishing—Removal of air by overfinishing, removes air from the surface of the concrete, typically resulting in distress by scaling of the detrained zone of cement paste adjacent to the overfinished surface.

The generation and stabilization of air at the time of mixing and ensuring it remains at the appropriate amount and air void size until the concrete hardens are the largest day-to-day challenges for the ready mix concrete producer in North America.

Adequately air-entrained concrete remains one of the most difficult types of concrete to make. The air content and the characteristics of the air void system entrained into the concrete cannot be controlled by direct quantitative means, but only indirectly through the amount/type of air-entraining agent added to the mixture. Factors such as the composition and particle shape of the aggregates, the type and quantity of cement in the mix, the consistency of the concrete, the type of mixer used, the mixing time, and the temperature all influence the performance of the air-entraining agent. The void size distribution in ordinary air-entrained concrete can show a very wide range of variation, between 10 and 3,000 micrometers ($\mu m$) or more. In such concrete, besides the small voids which are essential to cyclic freeze-thaw resistance, the presence of larger voids—which contribute little to the durability of the concrete and could reduce the strength of the concrete—has to be accepted as an unavoidable feature The characteristics of an air void system in hardened concrete are determined by means of ASTM C457 Standard Test method for Microscopical Determination of Parameters of the Air-Void System in Hardened concrete. These characteristics are expressed as a series of parameters that are indicative of the average voids size (specific surface area), volumetric abundance (air content) and average distance between the voids (spacing factor). These values have been used in the concrete industry to determine the expected performance and durability of concrete in a water-saturated cyclic freezing environment. ACI guidelines recommend that the specific area be greater than 600 $in^{-1}$ and the spacing factor equal to or less than 0.008 in to ensure resistance to freezing and thawing cycles.

Those skilled in the art have learned to control for these influences by the application of appropriate rules for making air-entrained concrete. They do, however, require the exercise of particular care in making such concrete and continually, checking the air content, because if the air content is too low, the frost resistance of the concrete will be inadequate, while on the other hand, if the air content is too high it will adversely affect the compressive strength.

The methods for controlling air voids in the prior art often result in inconsistent performance. If air bubbles of acceptable size and spacing are not entrained by the action of mixing, then no amount of bubble stabilizing chemical systems can produce an acceptable air void structure in the hardened concrete.

Therefore, it is desirable to provide an admixture which produces a freeze-thaw durable void structure directly in a wet cast cementitious mixture, without requiring the shear conditions for generation of properly sized air bubbles during mixing. The void structures may comprise optimally sized voids to the wet cast mixture that provide the cementitious composition with improved freeze-thaw durability. The admixture should also reduce or eliminate the reduction of compressive strength for products manufactured from wet cast mixtures containing conventional air-entraining chemical admixtures.

SUMMARY

A cementitious freeze-thaw damage resistant wet cast composition is provided that comprises hydraulic cement, gas generating additives, and optionally polymeric microspheres.

A method for preparing a freeze-thaw damage resistant wet cast cementitious composition is provided that comprises forming a mixture of water and hydraulic cement, gas generating additives, and optionally polymeric microspheres.

DETAILED DESCRIPTION

An improved freeze-thaw durability wet cast cementitious composition is provided. The composition uses an added chemical or blend of chemicals that generate gas when dispersed into the cementitious mixture and optionally expanded or unexpanded polymeric microspheres that are blended directly into the mixture. The polymeric microspheres are produced and marketed under a variety of trade names and use a variety of polymeric materials to form the wall of the particle.

The use of gas generators and optionally polymeric microspheres substantially eliminates most of the problems in the current art. It also makes it possible to use some materials, i.e., low grade, high-carbon fly ash, which are currently landfilled as they are not usable in air-entrained concrete without further treatment. This results in cement savings, and therefore economic savings. As the voids "created" by this approach are much smaller than those obtained by conventional Air Entraining Agents (AEAs), the volume of voids that is required to achieve the desired durability can be much lower (less than about 4 volume percent versus typically 5-6 percent) than in conventional air-entrained concrete. Therefore, a higher compressive strength can be achieved with the new method at the same level of protection to freezing and thawing. Consequently, the most expensive component used to achieve strength, i.e., cement, can be saved.

The wet cast cementitious composition and method of producing it use in-situ gas generation coupled with the optional addition of polymeric microspheres to provide void spaces in the cementitious material matrix prior to final setting, and such void spaces act to increase the freeze-thaw durability of the cementitious material. Polymeric microspheres and in-situ gas generation introduces voids into the wet cast cementitious composition to produce a fully formed void structure in the concrete that resists degradation produced by freeze-thaw cycles and does not rely on air bubble stabilization during mixing of the wet cast cementitious composition. The freeze-thaw durability enhancement produced by in-situ gas generation and polymeric microspheres is based on a physical mechanism for relieving stresses produced when water freezes in a cementitious material. In conventional practice, properly sized and spaced voids are generated in the hardened material by using chemical admixtures to stabilize the air voids entrained to a concrete mixture during mixing. In conventional concrete mixtures these chemical admixtures as a class are called air entraining agents. In the present cementitious composition and method, gas generated in the wet cast cementitious mixture at some time prior to final set and the optional addition of polymeric microspheres produces voids in the hardened material. This method uses in-situ gas generation and the optional addition of polymeric microspheres to form a void structure and does not require the production and/or stabilization of air entrained during the mixing process.

In one embodiment, the use of polymeric microspheres in combination with a hydrazide provides increased quality control. The current art relies upon a volume measurement of entrained air using a pressure method. Given that the hydrazide does not release gas initially, it may be difficult to determine if it was actually added to the concrete. The polymeric microspheres, in comparison, can be identified in the plastic concrete by means of a rollameter. As the hydrazide may be co-mingled with the polymeric microspheres, the presence of the hydrazide could be inferred.

The cementitious wet cast compositions provided generally comprise hydraulic cement, gas generating additives, and optionally polymeric microspheres. Water is added to form the cementitious mixture into a paste. The cementitious wet cast compositions include poured cement compositions and articles formed from cementitious compositions.

The hydraulic cement can be a portland cement, a calcium aluminate cement, a magnesium phosphate cement, a magnesium potassium phosphate cement, a calcium sulfoaluminate cement or any other suitable hydraulic binder. Aggregate may be included in the cementitious wet cast mixture. The aggregate can be silica, quartz, sand, crushed marble, glass spheres, granite, limestone, calcite, feldspar, alluvial sands, any other durable aggregate, and mixtures thereof.

The use of aluminum powder was historically one of the means of producing gas bubbles in cementitious systems. There are a number of advantages of using a hydrazide over aluminum powder. The first is the formation of nitrogen gas instead of hydrogen gas (formed by reaction of aluminum powder with water at alkaline pH), which is much less dangerous. The second is that the particles of aluminum powder are generally larger than the hydrazide powder, and generate bubbles that are larger and tend to burrow channels into the structure. As a result, aluminum powder does not always produce a good bubble structure in the hardened concrete system for purposes of resistance to freezing and thawing. The third advantage is that the reaction of aluminum powder is highly temperature dependent, unlike the hydrolysis reaction of the hydrazide.

The gas generating additives may be added to cementitious compositions in the amount of about 0.005 percent to about 2 percent solid by weight of dry cement. The gas generating additives are any compound that generates nitrogen, oxygen, hydrogen, carbon dioxide, carbon monoxide, ammonia, or methane gas and come from a large range of chemistries, for example nitrogen gas generating compounds such as hydrazine, hydrazide, azide, azo compounds, azodicarbonamides, toluene sulfonylhydrazide, benzenesulfonyl hydrazide, toluenesulfonyl acetone hydrazone, toluene sulfonylsemicarbazide, phenyltetrazole, dinitrosopentamethylenetetramine; hydrogen gas generating compounds such as sodium borohydride; oxygen gas generating compounds such as organic peroxide and inorganic peroxide; carbon dioxide generating compounds such as sodium bicarbonate or other alkali metal or alkaline earth carbonates; and air generating compounds such as activated carbon. An example of a hydrazide is 4,4"-oxydibenzenesulfonyl hydrazide. Some of the attributes of 4,4"-oxydibenzenesulfonyl hydrazide are that it decomposes after the cementitious composition is in place and it is relatively insoluble in water; consequently it is not significantly affected by mechanical action during transport. This material has historically been used to provide some expansive offset to the chemical shrinkage in mortars and grouts, but has not been used in a method to reduce damage done to cementitious compositions exposed to freeze-thaw cycles. The combination of gas generators and optionally polymeric microspheres provides bulk resistance to freeze thaw damage, as well as resistance to surface scaling.

The polymeric microspheres are of an average diameter of about 100 micrometers or less, and in certain embodiments with an average diameter of less than about 25 micrometers, with a hollow core and compressible wall. Expanded polymeric microspheres (formed by expansion of a self contained liquid to gas phase) or unexpanded polymeric microspheres (containing unexpanded liquid phase) may be used. The interior portion of the polymeric microspheres comprises a void cavity or cavities that may contain gas (gas filled) as in expanded polymeric microspheres or liquid (liquid filled) such as in unexpanded polymeric microspheres.

The polymeric microspheres may be comprised of a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, and copolymers thereof, such as copolymers of vinylidene chloride-acrylonitrile, polyacrylonitrile-copolymethacrylonitrile, polyvinylidene chloride-polyacrylonitrile, or vinyl chloride-vinylidene chloride, and the like. As the polymeric microspheres are composed of polymers, the wall is flexible, such that it moves in response to pressure. This is in comparison to glass, ceramic or other inflexible materials which produce microspheres with rigid structures that fracture when exposed to pressure. The material from which the polymeric microspheres are to be made, therefore, is flexible, yet resistant to the alkaline environment of cementitious compositions.

In certain embodiments the dimensions of the spheres would be those that are smaller than about 10 μm in average diameter. The smaller the diameter of the polymeric microspheres, the less that is required to achieve the desired spacing factor (which is a predictor of resistance to freezing and thawing). This is beneficial from a performance perspective, in that less of a decrease in compressive strength occurs by their addition, as well as an economic perspective, since a less mass of spheres is required. Similarly, the wall thickness of the polymeric microspheres should be as thin as possible, to minimize material cost, but thick enough to resist damage/fracture during the cementitious composition mixing, placing, consolidating and finishing processes.

The amount of polymeric microspheres to be added to the cementitious composition is about 0.05 percent to 4 percent of total volume or about 0.01 percent by weight of dry cement to about 4 percent by weight of dry cement.

The gas generators and polymeric microspheres may be added to cementitious compositions in a number of forms. The first is as a dry powder, in which dry powder handling equipment for use with very low bulk density material can be used. The polymeric microspheres are available as a damp powder, which is 85% water by weight. In certain embodiments use of a liquid admixture such as a paste or slurry substantially reduces the loss of material during the charging of the mixer. A third form is as a compact mass, such as a block or puck, similar to the DELVO® ESC admixture sold by Degussa Admixtures, Inc. Cleveland, Ohio. The polymeric microspheres and the gas-generating additive powder are preformed into discreet units with an adhesive that breaks down in water.

The cementitious composition described herein may contain other additives or ingredients and should not be limited to the stated formulations. Cement additives that can be added include, but are not limited to: air entrainers, aggregates, pozzolans, dispersants, set and strength accelerators/enhancers, set retarders, water reducers, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, alkali-reactivity reducer, bonding admixtures, shrinkage reducing admixtures, and any other admixture or additive that does not adversely affect the properties of the cementitious composition.

Aggregate can be included in the cementitious formulation to provide for mortars which include fine aggregate, and concretes which also include coarse aggregate. The fine aggregate are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed marble, glass spheres, granite, limestone, calcite, feldspar, alluvial sands, sands or any other durable aggregate, and mixtures thereof.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties. Diatomaceous earth, opaline cherts, clays, shales, fly ash, slag, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C618.

If used, silica fume can be uncompacted or can be partially compacted or added as a slurry. Silica fume additionally reacts with the hydration byproducts of the cement binder, which provides for increased strength of the finished articles and decreases the permeability of the finished articles. The silica fume, or other pozzolans such as fly ash or calcined clay such as metakaolin, can be added to the cementitious wet cast mixture in an amount from about 5% to about 70% based on the weight of cementitious material.

A dispersant if used in the cementitious composition can be any suitable dispersant such as lignosulfonates, beta naphthalene sulfonates, sulfonated melamine formaldehyde condensates, polyaspartates, polycarboxylates with and without polyether units, naphthalene sulfonate formaldehyde condensate resins for example LOMAR D® dispersant (Cognis Inc., Cincinnati, Ohio), or oligomeric dispersants.

Polycarboxylate dispersants can be used, by which is meant a dispersant having a carbon backbone with pendant side chains, wherein at least a portion of the side chains are attached to the backbone through a carboxyl group or an ether group. The term dispersant is also meant to include those chemicals that also function as a plasticizer, high range water reducer, fluidizer, antiflocculating agent, or superplasticizer for cementitious compositions. Examples of polycarboxylate dispersants can be found in U.S. Pub. Ser. No. 2002/0019459 A1, U.S. Pat. No. 6,267,814, U.S. Pat. No. 6,290,770, U.S. Pat. No. 6,310,143, U.S. Pat. No. 6,187,841, U.S. Pat. No. 5,158,996, U.S. Pat. No. 6,008,275, U.S. Pat. No. 6,136,950, U.S. Pat. No. 6,284,867, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, and U.S. Pat. No. 5,912,284, U.S. Pat. No. 5,840,114, U.S. Pat. No. 5,753,744, U.S. Pat. No. 5,728,207, U.S. Pat. No. 5,725,657 , U.S. Pat. No. 5,703,174, U.S. Pat. No. 5,665,158, U.S. Pat. No. 5,643,978, U.S. Pat. No. 5,633,298, U.S. Pat. No. 5,583,183, and U.S. Pat. No. 5,393,343, which are all incorporated herein by reference.

The polycarboxylate dispersants used in the system can be at least one of the dispersant formulas a) through j):

a) a dispersant of Formula (I):

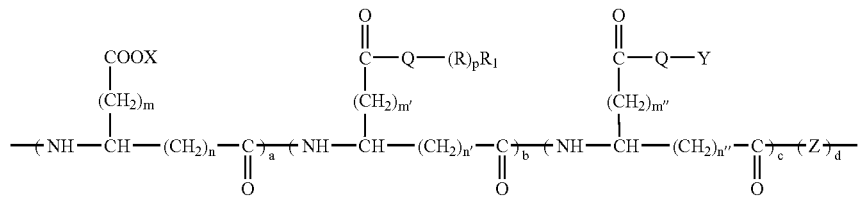

wherein in Formula (I)

X is at least one of hydrogen, an alkali earth metal ion, an alkaline earth metal ion, ammonium ion, or amine;

R is at least one of $C_1$ to $C_6$ alkyl(ene) ether or mixtures thereof or $C_1$ to $C_6$ alkyl(ene) imine or mixtures thereof;

Q is at least one of oxygen, NH, or sulfur;

p is a number from 1 to about 300 resulting in at least one of a linear side chain or branched side chain;

$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;

Y is at least one of hydrogen, an alkali earth metal ion, an alkaline earth metal ion, ammonium ion, amine, a hydrophobic hydrocarbon or polyalkylene oxide moiety that functions as a defoamer;

m, m', m", n, n', and n" are each independently 0 or an integer between 1 and about 20;

Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

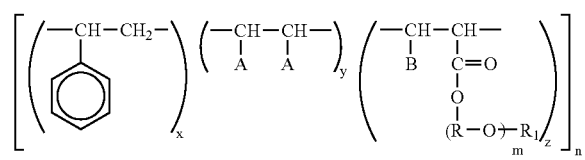

wherein in Formula (II):

A is COOM or optionally in the "y" structure an acid anhydride group (—CO—O—CO—) is formed in place of the A groups between the carbon atoms to which the A groups are bonded to form an anhydride;

B is COOM

M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;

R is a $C_{2-6}$ alkylene radical;

R1 is a $C_{1-20}$ alkyl, $C_{6-9}$ cycloalkyl, or phenyl group;

x, y, and z are a number from 0.01 to 100;

m is a number from 1 to 100; and n is a number from 10 to 100;

c) a dispersant comprising at least one polymer or a salt thereof having the form of a copolymer of i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and ii) a monomer having the formula $CH_2=CHCH_2—(OA)_n$ OR, wherein n is an integer from 1-90 and R is a $C_{1-20}$ alkyl group;

d) a dispersant obtained by copolymerizing 5 to 98% by weight of an (alkoxy)polyalkylene glycol mono(meth) acrylic ester monomer (a) represented by the following general formula (1):

(1)

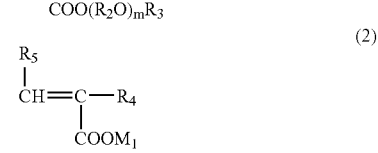

(2)

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

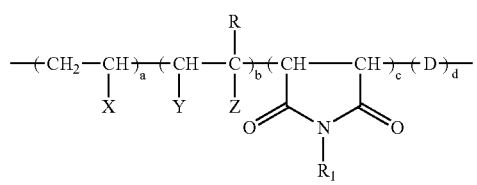

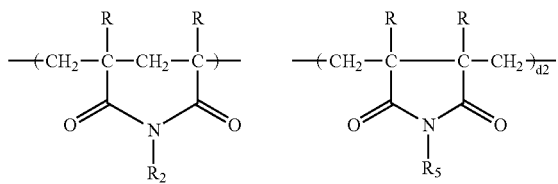

wherein in Formula (III):

D=a component selected from the group consisting of the structure d1, the structure d2, and mixtures thereof;

X=H, $CH_3$, $C_2$ to $C_6$ Alkyl, Phenyl, p-Methyl Phenyl, or Sulfonated Phenyl;

Y=H or —COOM;

R=H or $CH_3$;

Z=H, —$SO_3M$, —$PO_3M$, —COOM, —$O(CH_2)_nOR_3$ where n=2 to 6, —$COOR_3$, or —$(CH_2)_nOR_3$ where n=0 to 6, —$CONHR_3$, —$CONHC(CH_3)_2$ $CH_2SO_3M$, —$COO(CHR_4)_nOH$ where n=2 to 6, or —$O(CH_2)_nOR_4$ wherein n=2 to 6;

$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, or about $C_6$ to about $C_{10}$ aryl;

M=H, Alkali Metal, Alkaline Earth Metal, Ammonium, Amine, triethanol amine, Methyl, or $C_2$ to about $C_6$ Alkyl;

a=0 to about 0.8;

b=about 0.2 to about 1.0;

c=0 to about 0.5;

d=0 to about 0.5;

wherein a, b, c, and d represent the mole fraction of each unit and the sum of a, b, c, and d is 1.0;

wherein a can represent 2 or more differing components in the same dispersant structure;

wherein b can represent 2 or more differing components in the same dispersant structure;

wherein c can represent 2 or more differing components in the same dispersant structure; and wherein d can represent 2 or more differing components in the same dispersant structure;

g) a dispersant of Formula (IV):

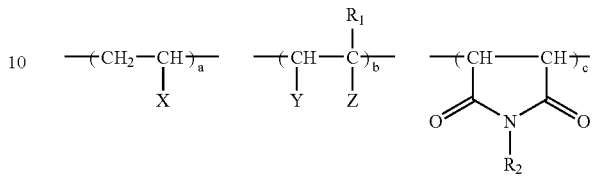

wherein in Formula (IV):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, p-Methyl Phenyl, p-Ethyl Phenyl, Carboxylated Phenyl, or Sulfonated Phenyl;

Y=H, —COOM, —COOH, or W;

W=a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;

Z=H, —COOM, —$O(CH_2)_nOR_3$ where n=2 to 6, —$COOR_3$, —$(CH_2)_nOR_3$ where n=0 to 6, or —$CONHR_3$;

$R_1$=H, or $CH_3$;

$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$ =$C_1$ to $C_{18}$ alkyl or $C_6$ to $C_{18}$ alkyl aryl;

M=Alkali Metal, Alkaline Earth Metal, Ammonia, Amine, monoethanol amine, diethanol amine, triethanol amine, morpholine, imidazole;

a=0.01-0.8;

b=0.2-0.99;

c=0-0.5;

wherein a, b, c represent the mole fraction of each unit and the sum of a, b, and c, is 1;

wherein a can represent 2 or more differing components in the same dispersant structure; and wherein c can represent 2 or more differing components in the same dispersant structure;

h) a random copolymer corresponding to the following Formula (V) in free acid or salt form having the following monomer units and numbers of monomer units:

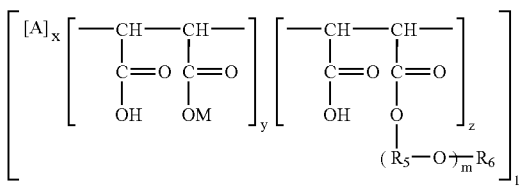

wherein A is selected from the moieties (i) or (ii)

$$-CR_1R_2-CR_3R_4- \quad (i)$$

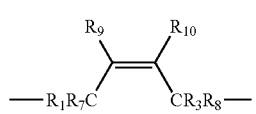

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group $—(R_5O)_mR_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated mono and/or dicarboxylic acids, comprising:
  i) 0 to 90 mol % of at least one component of the formula 3a or 3b:

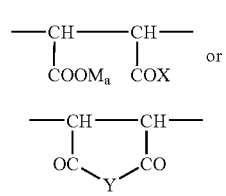

wherein M is a hydrogen atom, a mono- or divalent metal cation, an ammonium ion or an organic amine residue, a is 1, or when M is a divalent metal cation a is ½;

wherein X is $—OM_a$,
  $—O—(C_mH_{2m}O)_n—R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
  $—NHR_2$, $—N(R^2)_2$ or mixtures thereof in which $R^2=R^1$ or $—CO—NH_2$; and wherein Y is an oxygen atom or $—NR^2$;

ii) 1 to 89 mol % of components of the general formula 4:

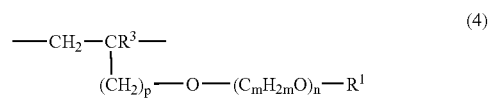

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is independently 2 to 4, and n is 0 to 100, and iii) 0 to 10 mol % of at least one component of the formula 5a or 5b:

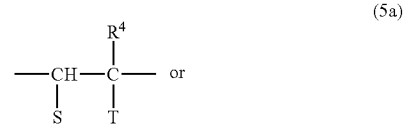

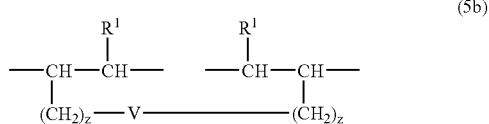

wherein S is a hydrogen atom or $—COOM_a$ or $—COOR_5$, T is $—COOR_5$, $—W—R_7$, $—CO—[—NH—(CH2)3)—]_s$ $—W—R_7$, $—CO—O—(CH_2)_z—W—R_7$, a radical of the general formula:

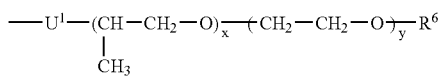

or $—(CH_2)_z—V—(CH_2)_z—CH=CH—R_1$, or when S is $—COOR_5$ or $—COOM_a$, $U_1$ is $—CO—NHM—$, $—O—$ or $—CH_2O$, $U_2$ is $—NH—CO—$, $—O—$ or $—OCH_2$, V is $—O—CO—C_6H_4—CO—O—$ or $—W—$, and W is

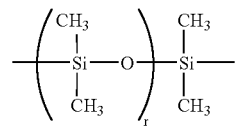

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6=R_1$ or

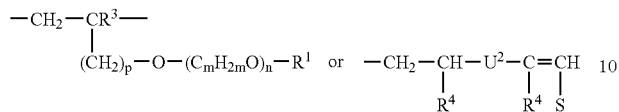

$R_7=R_1$ or

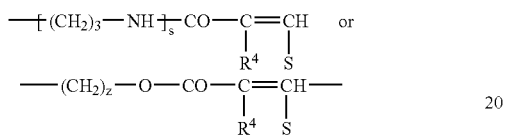

r is 2 to 100, s is 1 or 2, x is 1 to 150, y is 0 to 15 and z is 0 to 4;

iv) 0 to 90 mol % of at least one component of the formula 6a, 6b, or 6c:

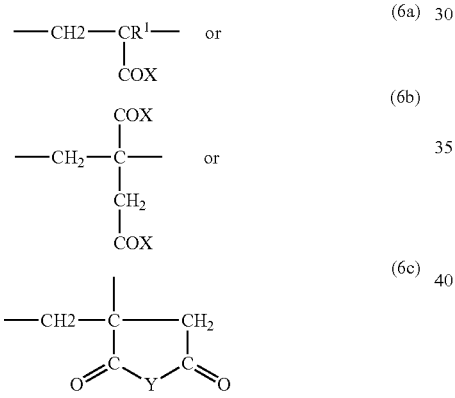

wherein M is a hydrogen atom, a mono- or divalent metal cation, an ammonium ion or an organic amine residue, a is 1, or when M is a divalent metal cation a is ½;

wherein X is $—OM_a$, $—O—(C_mH_{2m}O)_n—R$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, $—NH—(C_mH_{2m}O)_n—R^1$, $—NHR_2$, $—N(R^2)_2$ or mixtures thereof in which $R^2=R^1$ or $—CO—NH_2$; and wherein Y is an oxygen atom or $—NR^2$;

j) a copolymer of dicarboxylic acid derivatives and oxyalkylene glycol-alkenyl ethers, comprising:

i) 1 to 90 mol. % of at least one member selected from the group consisting of structural units of formula 7a and formula 7b:

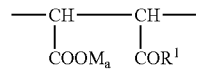

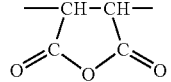

wherein M is H, a monovalent metal cation, a divalent metal cation, an ammonium ion or an organic amine;

a is ½ when M is a divalent metal cation or 1 when M is a monovalent metal cation;

wherein $R^1$ is $—OM_a$, or $—O—(C_mH_{2m}O)_n—R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $—COOM_a$, $—(SO_3)M_a$, and $—(PO_3)M_{a2}$;

m is 2 to 4;

n is 1 to 200;

ii) 0.5 to 80 mol. % of the structural units of formula 8:

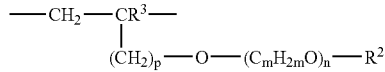

wherein $R^3$ is H or a $C_{1-5}$ aliphatic hydrocarbon;

p is 0 to 3;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $—COOM_a$, $—(SO_3)M_a$, and $—(PO_3)M_{a2}$;

m is 2 to 4;

n is 1 to 200;

iii) 0.5 to 80 mol. % structural units selected from the group consisting of formula 9a and formula 9b:

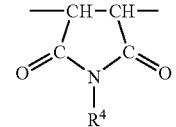

wherein $R^4$ is H, $C_{1-20}$ aliphatic hydrocarbon that is optionally substituted with at least one hydroxyl group, $—(C_mH_{2m}O)_n—R^2$, $—CO—NH—R^2$, $C_{5-8}$ cycloaliphatic hydrocarbon, or a $C_{6-14}$ aryl that is optionally substituted with at least one member selected from the group consisting of $—COOM_a$, $—(SO_3)M_a$, and $—(PO_3)M_{a2}$;

M is H, a monovalent metal cation, a divalent metal cation, an ammonium ion or an organic amine;

a is ½ when M is a divalent metal cation or 1 when M is a monovalent metal cation;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —COOM$_a$, —(SO$_3$)M$_a$, and —(PO$_3$)M$_{a2}$;

m is 2 to 4;

n is 1 to 200;

iv) 1 to 90 mol. % of structural units of formula 10

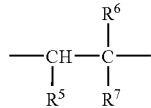
(10)

wherein R$^5$ is methyl, or methylene group, wherein R$^5$ forms one or more 5 to 8 membered rings with R$^7$;

R$^6$ is H, methyl, or ethyl;

R$^7$ is H, a C$_{1-20}$ aliphatic hydrocarbon, a C$_{6-14}$ aryl that is optionally substituted with at least one member selected from the group consisting of —COOM$_a$, —(SO$_3$)M$_a$, and —(PO$_3$)M$_{a2}$, a C$_{5-8}$ cycloaliphatic hydrocarbon, —OCOR$^4$, —OR$^4$, and —COOR$^4$, wherein R$^4$ is H, a C$_{1-20}$ aliphatic hydrocarbon that is optionally substituted with at least one —OH, —(C$_m$H$_{2m}$O)$_n$—R$^2$, —CO—NH—R$^2$, C$_{5-8}$ cycloaliphatic hydrocarbon, or a C$_{6-14}$ aryl residue that is optionally substituted with a member selected from the group consisting of —COOM$_a$, —(SO$_3$)M$_a$, and —(PO$_3$)M$_{a2}$;

In formula (e) the word "derived" does not refer to derivatives in general, but rather to any polycarboxylic acid/salt side chain derivatives of oligoalkyleneglycols, polyalcohols and polyalkylene glycols that are compatible with dispersant properties and do not destroy the graft polymer.

The substituents in the optionally substituted aryl radical of formula (i), containing 6 to 14 carbon atoms, may be hydroxyl, carboxyl, C$_{1-14}$ alkyl, or sulfonate groups.

The substituents in the substituted benzene may be hydroxyl, carboxyl, C$_{1-14}$ alkyl, or sulfonate groups.

The term oligomeric dispersant refers to oligomers that are a reaction product of:

(k) component A, optionally component B, and component C; wherein each component A is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof; wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly (vinyl pyrrolidones), poly(methyl vinyl ethers), poly (ethylene imines), poly(acrylamides), polyoxazoles, or mixtures thereof, that are disclosed in U.S. Pat. No. 6,133, 347, U.S. Pat. No. 6,492,461, and U.S. Pat. No. 6,451,881, which are hereby incorporated by reference.

Set and strength accelerators/enhancers that can be used include, but are not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (preferably bromide), Examples of accelerators that can be used include, but are not limited to, POZZOLITH® NC534, non chloride type accelerator and/or RHEOCRETE® CNI calcium nitrite-based corrosion inhibitor both sold under the trademarks by Degussa Admixtures, Inc. of Cleveland, Ohio.

The salts of nitric acid have the general formula M(NO$_3$)$_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula M(NO$_2$)$_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula M(SCN)$_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is N[H]$_c$ [(CH$_2$)$_d$CHRCH$_2$R]$_e$, where R is independently H or OH, c is 3-e, d is 0 to about 4 and e is 1 to about 3. Examples include, but are not limited to, are monoethanoalamine, diethanolamine, triethanolamine and triisopropanolamine.

The thiosulfate salts have the general formula M$_f$(S$_2$O$_3$)$_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or C$_1$ to about C$_{10}$ alkyl, and M is alkali metal or an alkaline earth metal or aluminum. Preferred are carboxylic acid salts of Na, K, Mg, Ca and Al. An example of carboxylic acid salt is calcium formate.

A polyhydroxylalkylamine can have the general formula

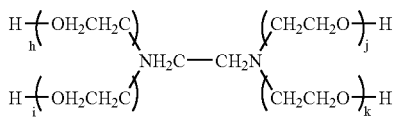

wherein h is 1 to 3, i is 1 to 3, j is 1 to 3, and k is 0 to 3. A preferred polyhydroxyalkylamine is tetrahydroxyethylethylenediamine.

Set retarding, or also known as delayed-setting or hydration control, admixtures are used to retard, delay, or slow the rate of setting of cementitious compositions. They can be added to the cementitious composition upon initial batching or sometime after the hydration process has begun. Set retarders are used to offset the accelerating effect of hot weather on the setting of cementitious compositions, or delay the initial set of cementitious compositions when difficult conditions of placement occur, or problems of delivery to the job site, or to allow time for special finishing processes. Most set retarders also act as low level water reducers and can also be used to entrain some air into cementitious compositions. Lignosulfonates, hydroxylated carboxylic acids, borax, gluconic, tartaric and other organic acids and their corresponding salts, phosphonates, certain carbohydrates such as sugars, polysaccharides and sugar-acids and mixtures thereof can be used as retarding admixtures.

Corrosion inhibitors in cementitious compositions serve to protect embedded reinforcing steel from corrosion. The high alkaline nature of cementitious compositions causes a passive and non-corroding protective oxide film to form on the steel. However, carbonation or the presence of chloride ions from deicers or seawater, together with oxygen can destroy or penetrate the film and result in corrosion. Corrosion-inhibiting admixtures chemically slow this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

In the construction field, many methods of protecting cementitious compositions from tensile stresses and subsequent cracking have been developed through the years. One modern method involves distributing fibers throughout a fresh cementitious mixture. Upon hardening, this cementitious composition is referred to as fiber-reinforced cement. Fibers can be made of zirconium materials, carbon, steel, fiberglass, or synthetic materials, e.g., polypropylene, nylon, polyethylene, polyester, rayon, high-strength aramid, or mixtures thereof.

Dampproofing admixtures reduce the permeability of concrete that has low cement contents, high water-cement ratios, or a deficiency of fines in the aggregate portion. These admixtures retard moisture penetration into wet concrete and include certain soaps, stearates, and petroleum products.

Permeability reducers are used to reduce the rate at which water under pressure is transmitted through cementitious compositions. Silica fume, fly ash, ground slag, metakaolin, natural pozzolans, water reducers, and latex can be employed to decrease the permeability of the cementitious compositions.

Pumping aids are added to cement mixes to improve pumpability. These admixtures thicken the fluid cementitious compositions, i.e., increase its viscosity, to reduce de-watering of the paste while it is under pressure from the pump. Among the materials used as pumping aids in cementitious compositions are organic and synthetic polymers, hydroxyethylcellulose (HEC) or HEC blended with dispersants, polysaccharides, organic flocculents, organic emulsions of paraffin, coal tar, asphalt, acrylics, bentonite and pyrogenic silicas, nano-silicas, natural pozzolans, fly ash and hydrated lime.

Bacteria and fungal growth on or in hardened cementitious compositions may be partially controlled through the use of fungicidal, germicidal, and insecticidal admixtures. The most effective materials for these purposes are polyhalogenated phenols, dialdrin emulsions, and copper compounds.

Coloring admixtures are usually composed of pigments, either organic such as phthalocyanine or inorganic pigments such as metal-containing pigments that comprise, but are not limited to metal oxides and others, and can include, but are not limited to, iron oxide containing pigments such as CHROMIX®L (Degussa Admixtures, Inc. Cleveland Ohio), chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, ultramarine blue and cobalt blue.

Alkali-reactivity reducers can reduce the alkali-aggregate reaction and limit the disruptive expansion forces that this reaction can produce in hardened cementitious compositions. Pozzolans (fly ash, silica fume), blast-furnace slag, salts of lithium and barium are especially effective.

The shrinkage reducing agent which can be used comprises but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® admixture is an example of a shrinkage reducing agent (available from Degussa Admixtures, Inc. of Cleveland, Ohio) that can be used.

Examples of the previously described embodiments were tested for their effect on Freeze-Thaw (F/T) durability. The concrete samples were prepared by adding water to a rotary drum mixer, followed by coarse aggregate and cement. The gas generating additive was then added on top of these materials, followed by sand and the drum mixer turned on. If the mixture contained a conventional air entraining agent (AEA), it was added on top of the sand. Additional water was then added during mixing to achieve the desired slump level. The mixer was rotated at a speed of 20 rpm for 5 minutes. After 5 minutes, the mixer was stopped, and the slump and air were measured and the specimens cast. Optionally, the mixer could be turned back on again (at 20 rpm or at 3 to 4 rpm) and mixed for additional time periods to simulate haul time in a truck mixer. The mixer was stopped at pre-determined time intervals and slump and air were tested again. Additional specimens were then cast if needed.

Relevant ASTM testing procedures were: Petrographic examination (ASTM C 457); Freeze thaw testing (ASTM C 666—Procedure A)—[greater than 60 is considered acceptable]; Salt scaling testing (ASTM C 672)—[0=best, 5=worst]; Compressive strength measurements (ASTM C 39); Air Content by Pressure Method (ASTM C 231); Unit Weight (ASTM C 138).

The samples in Table 1 were prepared to determine the effect of different temperatures on the formation of nitrogen from hydrazide gas generator and to investigate the effect of extended mixing times at low rpm.

TABLE 1

| | Sample | | | | |
|---|---|---|---|---|---|
| | 1 | 2 | 3 | 4 | 5 |
| Cement (lbs/yd$^3$) | 521 | 535 | 527 | 524 | 522 |
| Water (lbs/yd$^3$) | 300 | 307 | 313 | 316 | 323 |
| Sand (lbs/yd$^3$) | 1229 | 1263 | 1312 | 1305 | 1300 |
| Stone (lbs/yd$^3$) | 1806 | 1857 | 1928 | 1917 | 1910 |
| W/C Ratio | 0.58 | 0.57 | 0.59 | 0.60 | 0.62 |
| Sand/Aggregate | 0.42 | 0.42 | 0.42 | 0.42 | 0.42 |
| AEA (oz/cwt) | 0.90 | 0.65 | — | — | — |
| Gas Generator (% by cement weight) | — | — | 0.2 | 0.2 | 0.2 |
| Slump (in) | | | | | |
| 5 minutes (A) | 6.75 | 7 | 8 | 7.5 | 7.25 |
| 25 minutes (B) | — | 6.75 | 7.75 | 7 | 6.5 |
| 45 minutes (C) | — | 6 | 6 | 6 | 5.5 |
| 65 minutes (D) | — | 3 | 4 | 4.75 | 3.5 |
| % Air-PressureMethod | | | | | |
| 5 minutes | 7.3 | 5.4 | 2.5 | 2.6 | 2.7 |
| 25 minutes | — | 5.0 | 2.1 | 2.1 | 2.2 |
| 45 minutes | — | 4.6 | 2.0 | 2.2 | 2.3 |
| 65 minutes | — | 4.3 | 2.1 | 1.9 | 2.1 |
| Unit Wt. (lb/ft$^3$) | | | | | |
| 5 minutes | 142.8 | 146.8 | 151.1 | 150.4 | 150.2 |
| 25 minutes | — | 148.8 | 151.5 | 152.8 | 151.5 |
| 45 minutes | — | 149.2 | 152.9 | 152.8 | 151.4 |
| 65 minutes | — | 151.5 | 153.6 | 153.8 | 153.7 |
| Concrete Temp. (F. °) | | | | | |
| 5 minutes | 90 | 91 | 54 | 74 | 92 |
| 25 minutes | — | 86 | 56 | 74 | 92 |
| 45 minutes | — | 86 | 58 | 74 | 95 |
| 65 minutes | — | 86 | 56 | 72 | 87 |

AEA = Air Entraining Agent
W/C Ratio = Water to Cement Ratio

The samples showed no obvious effect of temperature or extended mixing time on gas generation, as evidenced by no significant change in plastic air contents or unit weights.

The sample in Table 2 was prepared to investigate the characteristics of the void system in the hardened state. The sample showed parameters for specific surface and for spacing factor that are generally accepted to impart good resistance to freezing and thawing cycles in a harsh environment.

TABLE 2

| | Sample 6 |
|---|---|
| Cement (lbs/yd$^3$) | 529 |
| Water (lbs/yd$^3$) | 310 |
| Sand (lbs/yd$^3$) | 1344 |
| Stone (lbs/yd$^3$) | 1933 |
| W/C Ratio | 0.59 |
| Sand/Aggregate | 0.43 |
| Gas Generator (% by cement weight) | 0.4 |
| Slump (in) 5 minutes | 5 |
| 10 minutes | 4.5 |
| 15 minutes | 4.25 |
| Plastic Air (%) 5 minutes | 2.0 |
| 10 minutes | 2.0 |
| 15 minutes | 2.3 |
| Hardened Void System (15 minutes) | |
| Air Content (%) | 4.3 |
| Specific Surface (in$^{-1}$) | 585 |
| Spacing Factor (in) | 0.008 |

W/C Ratio = Water to Cement Ratio

The samples in Table 3 were prepared to determine the ability of the nitrogen gas generators to provide freeze-thaw protection to concrete. Samples were tested against those containing air that was entrained using conventional surfactants.

TABLE 3

| | Sample | | | |
|---|---|---|---|---|
| | 7 | 8 | 9 | 10 |
| Cement (lbs/yd$^3$) | 575 | 574 | 565 | 569 |
| Water (lbs/yd$^3$) | 290 | 281 | 293 | 295 |
| Sand (lbs/yd$^3$) | 1328 | 1221 | 1348 | 1358 |
| Stone (lbs/yd$^3$) | 1883 | 1879 | 1850 | 1864 |
| W/C Ratio | 0.50 | 0.49 | 0.52 | 0.52 |
| Sand/Aggregate | 0.43 | 0.41 | 0.44 | 0.44 |
| AEA (oz/cwt) | 0.55 | 1.10 | — | — |
| Gas Generator (% by cement weight) | — | — | 0.2 | 0.4 |
| Slump (in) 5 minutes | 1.50 | 2.75 | 2.00 | 1.50 |
| Air (%) (Volumetric) 5 minutes | 3.5 | 6.0 | 2.6 | 3.4 |
| Compressive Strength (psi) | | | | |
| 7 day | 5020 | 4420 | 4310 | 4540 |
| 28 day | 6180 | 5530 | 5950 | 5500 |
| Freeze-Thaw Testing | | | | |
| Durability Factor (300 cycles) | 94 | 97 | 95 | 95 |
| Visual Scaling Rating of Freeze-Thaw Beams (300 cycles) | 3 | 2.5 | 2.5 | 2 |

AEA = Air Entraining Agent
W/C Ratio = Water to Cement Ratio

Table 3 demonstrates that additions of as little as 0.2% hydrazide by cement weight (Samples 8 and 9) provided sufficient protection to the cementitious composition for freezing and thawing damage and had similar or slightly better resistance to surface scaling than mixtures containing a conventional air-entraining agent.

The samples in Table 4 were prepared as described for the samples in Tables 1 to 3, with the addition that polymeric microspheres and gas-generating additive were added on top of the water, coarse aggregate, and cement, followed by sand.

The samples in Table 4 were tested for the ability of 20 and 40 μm average diameter expanded polymeric microspheres to provide freeze-thaw protection to concrete and improve the economics and performance in this application by synergizing the use of the polymeric microspheres together with a gas generator.

TABLE 4

| | Sample | | | | | | | | |
|---|---|---|---|---|---|---|---|---|---|
| | 11 | 12 | 13 | 14 | 15 | 16* | 17 | 18 | 19 |
| Cement (lbs/yd) | 565 | 569 | 565 | 560 | 555 | 560 | 565 | 565 | 570 |
| Water (lbs/yd) | 294 | 279 | 293 | 291 | 288 | 291 | 293 | 293 | 296 |
| Sand (lbs/yd) | 1287 | 1187 | 1330 | 1319 | 1308 | 1319 | 1330 | 1330 | 1341 |
| Stone (lbs/yd) | 1850 | 1865 | 1850 | 1835 | 1819 | 1835 | 1850 | 1850 | 1865 |
| W/C Ratio | 0.52 | 0.49 | 0.52 | 0.52 | 0.52 | 0.52 | 0.52 | 0.52 | 0.52 |
| Sand/Aggregate | 0.42 | 0.40 | 0.43 | 0.43 | 0.43 | 0.43 | 0.43 | 0.43 | 0.43 |
| AEA (oz/cwt) | 0.40 | 1.00 | — | — | — | — | — | — | — |
| Expanded Microspheres | — | — | 0.5 | 1 | 1.5 | 1.5 | 0.5 | 0.5 | 0.5 |
| Hydrazide (wt % by cement) | — | — | — | — | — | — | 0.05% | 0.10% | 0.20% |
| Slump (in) 5 minutes | 5.00 | 5.00 | 3.50 | 5.00 | 4.50 | 4.00 | 4.00 | 4.00 | 4.5 |
| % Air (Volumetric) 5 minutes | 3.8 | 6.2 | 2.0 | 2.5 | 2.8 | 2.3 | 2.0 | 2.0 | 1.9 |
| Compressive Strength (psi) | | | | | | | | | |
| 7 day | 4340 | 3660 | 4430 | 4300 | 4210 | 4160 | 4070 | 3790 | 3580 |
| 28 day | 5640 | 4860 | 6090 | 5660 | 5390 | 5530 | 5590 | 5200 | 4840 |
| Freeze-Thaw Testing | | | | | | | | | |
| Durability Factorcycles) | 93 | 93 | Fail | 74 | 87 | 84 | 77 | 93 | 92 |
| Scaling Rating (FT Beams) | 3 | 3 | | 3 | 3 | 3 | 3 | 2.5 | 2.5 |

AEA—Air Entraining Agent
W/C Ratio—water to cement ratio
*Mix 6 contains 40 um polymeric microspheres; otherwise 20 um polymeric microspheres The samples demonstrated that after 300 cycles of freezing and thawing testing, the minimum amount of 20 μm expanded spheres alone needed in the concrete mix to provide a target degree of protection from freeze-thaw damage was 1.0 volume % (samples 13-15). However, the combination of a small amount (0.05% by cement—sample 7) of gas generator together with 0.5 volume % of 20 μm expanded spheres gave good protection compared with 0.5 volume % polymeric microspheres only. Improved durability was observed with 0.5 volume % polymeric microspheres and 0.1% gas generator.

In one embodiment the cementitious freeze-thaw damage resistant wet cast composition comprises hydraulic cement, water, gas generating additives and optionally polymeric microspheres. In certain embodiments the gas generating additive may be a hydrazide, in one embodiment the gas generating additive may be 4,4'-oxydibenzenesulfonyl hydrazide. The polymeric microspheres may be gas-filled (expanded) or liquid-filled (unexpanded). Further the polymeric microspheres may comprise at least one of polyethylene, polypropylene, polymethyl methacrylate, poly-o-chlorostyrene, polyvinyl chloride, polyvinylidene chloride, polyacrylonitrile, polymethacrylonitrile, polystyrene, or copolymers or mixtures thereof thereof, for example but not for limitation such as copolymers of vinylidene chloride-acrylonitrile, polyacrylonitrile-copolymethacrylonitrile, polyvinylidene chloride-copolyacrylonitrile, or vinyl chloride-vinylidene chloride.

In another embodiment the cementitious wet cast composition comprises at least one of the following characteristics: the gas generating additive is present in a range from about 0.005 percent to about 5 percent by weight of dry cement; the polymeric microspheres are present in a range from about 0.01 percent to about 4 percent by weight of dry cement; the polymeric microspheres have an average diameter of less than about 100 μm; the polymeric microspheres have an average diameter of less than about 25 μm; or the polymeric microspheres have an average diameter of less than about 10 μm.

In another embodiment the cementitious wet cast compositions described above further comprise at least one of dispersants, air entrainers, set and strength accelerators/enhancers, set retarders, water reducers, aggregate, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, coloring admixtures, alkali-reactivity reducer, bonding admixtures, shrinkage reducing admixtures or mixtures thereof.

In another embodiment a method for preparing a freeze-thaw damage resistant wet cast cementitious composition from the compositions described above is provided that comprises providing a mixture of hydraulic cement, water, gas generating additives and optionally polymeric microspheres. In certain embodiments the gas generating additives and polymeric microspheres are each added independently as at least one of a compact mass, powder, or liquid admixtures such as a paste or slurry.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A cementitious freeze-thaw damage resistant wet cast composition adapted to be exposed to freeze-thaw cycles comprising hydraulic cement, gas generating additives, and flexible polymeric microspheres, wherein the flexible polymeric microspheres have an average diameter of about 100 micrometers or less.

2. The cementitious wet cast composition of claim 1 wherein the gas generating additive comprises a compound that generates nitrogen, oxygen, hydrogen, carbon dioxide, carbon monoxide, ammonia, or methane gas in the cementitious wet cast composition prior to setting.

3. The cementitious wet cast composition of claim 1 wherein the gas generating additive is at least one of a hydrazide, hydrazine, azide, or azo compound.

4. The cementitious wet cast composition of claim 1 wherein the gas generating additive is at least one of azodicarbonamide, sodium bicarbonate, organic peroxide, inorganic peroxide, toluenesulfonylhydrazide, benzenesulfonyl hydrazide, toluenesulfonyl acetone hydrazone, toluenesulfonylsemicarbazide, phenyltetrazole, sodium borohydride, activated carbon or dinitroso-pentamethylenetetramine.

5. The cementitious wet cast composition of claim 1 wherein the gas generating additive is 4,4'-oxydibenzenesulfonyl hydrazide.

6. The cementitious wet cast composition of claim 1 wherein the gas generating additive is present in an amount of about 0.005% to about 2% by weight of cement.

7. The cementitious wet cast composition of claim 1 having a volume of voids of about 4 volume percent or less.

8. The cementitious wet cast composition of claim 1 wherein the polymeric microspheres comprise a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, or copolymers, or mixtures thereof.

9. The cementitious wet cast composition of claim 1 wherein the polymeric microspheres comprise at least one copolymer of vinylidene chloride-acrylonitrile, polyvinylidene chloride-copolyacrylonitrile, polyacrylonitrile-co-polymethacrylonitrile, vinyl chloride-vinylidene chloride or mixtures thereof.

10. The cementitious wet cast composition of claim 1 wherein the polymeric microspheres are present in a range from about 0.05% to 4% of total volume.

11. The cementitious wet cast composition of claim 1 wherein the polymeric microspheres have an average diameter of about 10 μm or less.

12. The cementitious wet cast composition of claim 1 wherein the polymeric microspheres are at least one of gas filled or liquid filled.

13. The cementitious wet cast composition of claim 1 further comprising at least one of air entrainers, aggregates, pozzolans, dispersants, set and strength accelerators/enhancers, set retarders, water reducers, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, coloring admixtures, alkali-reactivity reducer, bonding admixtures, shrinkage reducing admixtures or mixtures thereof.

14. The cementitious wet cast composition of claim 13 wherein the dispersant is at least one of lignosulfonates, beta naphthalene sulfonates, sulfonated melamine formaldehyde condensates, polyaspartates, naphthalene sulfonate formaldehyde condensate resins, oligomers, polycarboxylates or mixtures thereof.

15. A method for preparing a freeze-thaw damage resistant wet cast cementitious composition adapted to be exposed to freeze-thaw cycles comprising forming a mixture of water, hydraulic cement, gas generating additives, and flexible polymeric microspheres, wherein the flexible polymeric microspheres have an average diameter of about 100 micrometers or less.

16. The method of claim 15, wherein the gas generating additives or polymeric microspheres are added to the mixture in at least one of the following forms:

a. compact mass;

b. powder; or c. liquid admixture.

17. The method of claim 15 wherein the gas generating additive comprises a compound that generates nitrogen, oxygen, hydrogen, carbon dioxide, carbon monoxide, ammonia, or methane gas in the cementitious wet cast composition prior to setting.

18. The method of claim 15 wherein the gas generating additive is at least one of a hydrazide, hydrazine, azide, or azo compound.

19. A method for preparing a freeze-thaw damage resistant wet cast cementitious composition adapted to be exposed to freeze-thaw cycles comprising forming a mixture of water, hydraulic cement, and a gas generating additive, wherein the gas generating additive comprises 4,4'-oxydibenzenesulfonyl hydrazide.

20. The cementitious wet cast composition prepared by the method of claim 19.

21. The cementitious wet cast composition of claim 20 further comprising at least one of air entrainers, aggregates, pozzolans, dispersants, set and strength accelerators/enhancers, set retarders, water reducers, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, coloring admixtures, alkali-reactivity reducer, bonding admixtures, shrinkage reducing admixtures or mixtures thereof; optionally wherein the dispersant if present is at least one of lignosulfonates, beta naphthalene sulfonates, sulfonated melamine formaldehyde condensates, polyaspartates, naphthalene sulfonate formaldehyde condensate resins, oligomers, polycarboxylates or mixtures thereof.

* * * * *